UNITED STATES PATENT OFFICE.

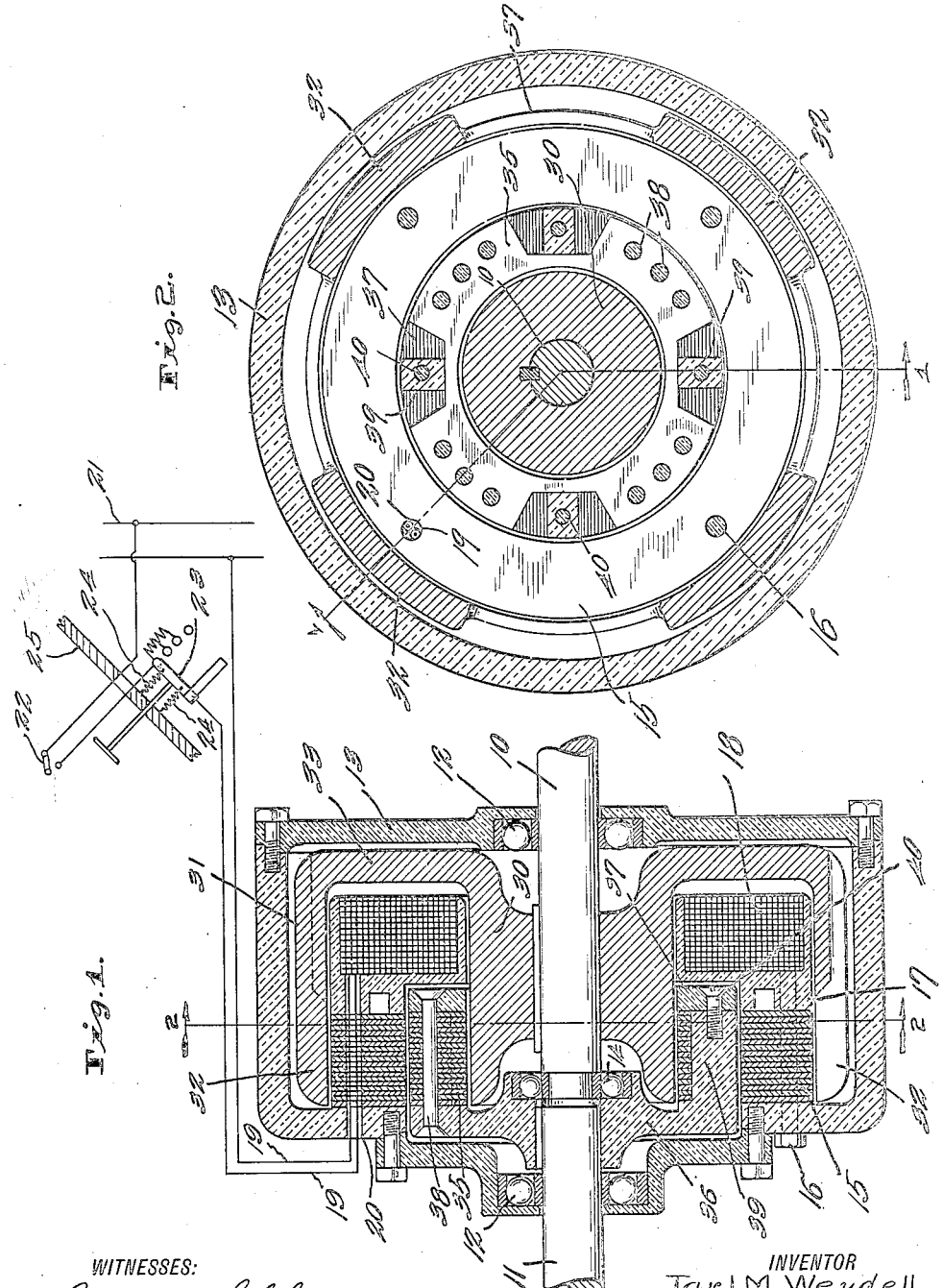

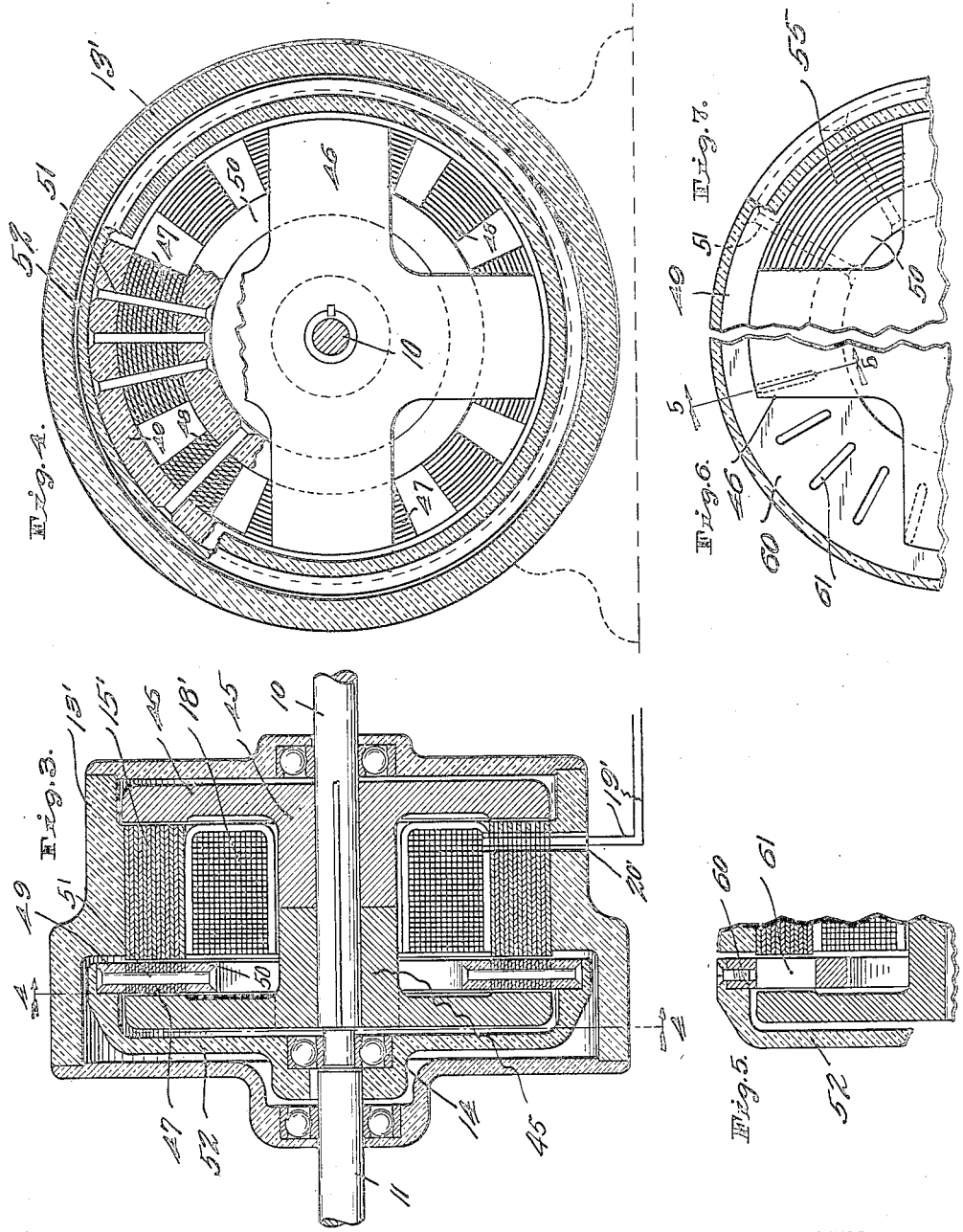

JARL M. WEYDELL, OF INDIANAPOLIS, INDIANA, ASSIGNOR OF ONE-HALF TO EDWARD E. STOUT, OF INDIANAPOLIS, INDIANA.

MAGNETIC CLUTCH.

1,271,401.   Specification of Letters Patent.   Patented July 2, 1918.

Application filed February 15, 1917. Serial No. 148,787.

*To all whom it may concern:*

Be it known that I, JARL M. WEYDELL, a subject of the King of Sweden, (who has declared his intention of becoming a citizen of the United States,) residing at Indianapolis, in the county of Marion and State of Indiana, have invented a new and useful Magnetic Clutch, of which the following is a specification.

It is the object of my invention to produce an electro-magnetic clutch for connecting two moving parts, and to do so without any sliding contacts and without any moving current-carrying parts; that is, to provide an electro-magnetic clutch which is energized by a stationary coil.

The accompanying drawings illustrate my invention. Figure 1 is an axial section through a magnetic clutch embodying one form of my invention, being taken substantially on the line 1—1 of Fig. 2, also showing diagrammatically the electrical connections; Fig. 2 is a section on the line 2—2 of Fig. 1; Fig. 3 is a section similar to Fig. 1, showing a magnetic clutch embodying another form of my invention; Fig. 4 is a section on the line 4—4 of Fig. 3; Fig. 5 is a fragmentary view showing a modification of that form of my invention shown in Fig. 3, being taken substantially on the line 5—5 of Fig. 6; Fig. 6 is a fragmentary view similar to a portion of Fig. 4, showing a modification of Fig. 5; Fig. 7 is another fragmentary view showing a further modification of that form of my invention shown in Figs. 3 and 4.

Two alined shafts 10 and 11 are mounted in suitable bearings 12 in a stationary frame 13. Either shaft may be the driving shaft and either the driven shaft. Preferably at their abutting ends the two shafts have a bearing 14 on each other. The stationary frame 13 is of brass or other nonmagnetic material and supports the magnetizing coil and part of the magnetic circuit. Each of the shafts 10 and 11 has fixed thereto one part of the magnetic circuit, so that such magnetic circuit comprises three parts—a stationary part carried by the stationary frame 13, and a part carried by each shaft 10 and 11.

In the arrangement shown in Figs. 1 and 2, the stationary part of the magnetic circuit consists of a laminated annular portion 15 built up of sheet iron punchings and clamped by bolts 16 between one end of the nonmagnetic frame 13 and a nonmagnetic coil support 17 which is annular in form and surrounds the shaft 10. This annular nonmagnetic coil support 17 supports the magnetizing coil 18, which likewise surrounds the shaft 10. The leading-in wires 19 to the coil 18 pass through alined holes 20 in the coil support 17, the annular laminæ 15, and the frame 13, whereby the coil may be energized from any suitable source 21. If the clutch is used for automobile work, the circuit of the coil 18 may include a manual switch 22 which cuts the clutch entirely in or out, and a spring-pressed foot-operated rheostat 23 which is operated by the foot of the driver so that when depressed it diminishes the strength of and finally cuts out the coil 18 and when allowed to rise under the action of its springs 24 cuts in such coil and gradually increases its strength to a maximum. This rheostat is suitably arranged in connection with the foot board 25 of the automobile.

The magnetic member carried by the shaft 10 comprises an inner portion 30 located radially within the coil support 17 and the laminæ 15, but spaced from the latter, an outer portion 31 around the outside of the coil support 17 and provided with a circumferential series of fingers 32 (shown as four in number) projecting over the outer surface of the laminæ 15, and a web 33 connecting the portions 30 and 31 beyond the free end of the coil support 17. This member may be made in one piece, and is of magnetic material preferably of high permeability. This member lies as close to the coil support 17 and to the exterior of the laminæ 15 as possible while still providing mechanical clearance.

The magnetic member carried by the shaft 11, as shown, consists of a plurality of sheet iron laminæ 35 of the shape shown in Fig. 2, so as to provide for definite projecting poles corresponding to the fingers 32. These laminæ are clamped between a nonmagnetic member 36 keyed on the shaft 11 and a nonmagnetic ring 37, being fastened thereto by cross-connecting bolts 38 which extend through the laminæ 35 and serve as conducting bars somewhat similar to the conducting bars of a squirrel cage rotor, the nonmagnetic members 36 and 37 corresponding to the short-circuiting rings of such a squirrel cage rotor. Conveniently, the member 36 has a series of integral fingers 39 which project in the notches between the poles of the laminæ 35, which fingers are fastened to the ring 37 by screws 40 and also serve as conducting bars connecting the rings at each end of the group of laminæ 35. The laminæ 35 lie between the laminæ 15 and the portion 30, fitting as closely to both these as possible while permitting clearance.

In operation, when the coil 18 is magnetized a magnetic flux is produced traveling from the portion 30 through the portion 33 and 31, and fingers 32 and thence across the laminæ 15 and 35 to the portion 30. There are three air gaps in this magnetic circuit, one between the fingers 32 and the laminæ 15, one between the laminæ 15 and the laminæ 35, and one between the laminæ 35 and the portion 30. This flux is concentrated between the fingers 32 and the outwardly projecting poles of the laminæ 35. If now one of the shafts—say the shaft 10—is rotated, these concentrated flux areas are likewise turned about the axis of the shafts 10 and 11, thereby tending to draw the laminæ 35 around in the same direction and thus to drive the shaft 11. This tendency to cause rotation of the laminæ 35 is increased by the squirrel cage rotor construction, whereby any slipping produces short-circuited currents between the ring 37 to the member 36 through the bolts 38 and the fingers 39, which short-circuited currents tend to prevent such relative slipping between the shafts. The amount of relative slipping which actually occurs depends upon the adjustment of the rheostat 23 and upon the load, for the magnetic clutch permits slipping automatically to take place when the load exceeds a predetermined value. By reason of the definite pole construction of the laminæ 35, there is a one-to-one speed ratio between the shafts 10 and 11 if the coil 18 is energized beyond a definite strength and the load on the driven shaft does not exceed a predetermined amount. Having the stationary magnetic member laminated minimizes eddy current loss.

In the arrangement shown in Figs. 3 and 4 the arrangement of the magnetic elements is slightly different. Here the stationary magnetic member is supported by its periphery within the non-magnetic frame 13', and consists of a spiral coil of sheet-iron strip 15', within which is located the magnetizing coil 18' supplied by wires 19' passing through a hole 20' in the spiral-formed laminations 15' and the frame 13'. The magnetic member carried by the shaft 10 consists of two parts, the hubs 45 of which abut, as is clear from Fig. 3, which hubs 45 are provided with outwardly projecting arms 46 at both axial ends of the spiral formed laminations 15'. The fingers 46 are close to the edges of such laminations at one end, but at the other end are spaced therefrom to provide room for the magnetic member carried by the shaft 11. This magnetic member consists of a series of wide sections 47 alternating with narrow sections 48 of spiral-formed sheet iron laminations (as is clear from Fig. 4). There are as many wide sections as there are pairs of arms 46. The sections 47 and 48 are mounted between external and internal short-circuiting rings 49 and 50, of nonmagnetic material, interconnected by cross-connecting bolts or rods 51 passing through such lamination sections. The outer ring 49 is mounted in a non-magnetic frame 52 fixed on the shaft 11.

In operation, the coil 18' creates a magnetic flux from the hub 45 outward through one set of arms 46, across the laminations 15', through the laminations 47, to the other set of arms 46 and back to the hub 45. This magnetic circuit also contains three air gaps, one between the arms 46 and the laminæ 15', one between the laminæ 15' and the laminæ 47, and one between the lamination 47 and the other arms 46. This flux is concentrated opposite the arms 46. When the shaft 10 is rotated, these concentrated flux areas tend to drag along in the same direction and at the same speed the laminæ 47, and the shaft 11 therewith. As before, any tendency to slip is resisted by the currents produced between the rings 49 and 50 through the bars 51, of which there are some through the wide sections 47 for carrying the short-circuited currents in one direction and some through the narrow sections 48 for carrying such currents in the other direction.

If desired, instead of having a magnetic member with definite poles on the shaft 11, such as the one composed of the wide and narrow sections 47 and 48, there may be a continuous annulus 55, as shown in Fig. 7. This annulus is wound up in a spiral strip in the same manner as is the spiral-formed annulus 15', and through it project the radial bolts 51 connecting the external and internal short-circuiting rings 49 and 50. In this case, the arms 46 are wholly relied on for the flux concentration, and there is always a certain slipping of the annulus 55 with relation to the arms 46. The amount of such slipping depends upon the strength of the magnetizing coil 18', and upon the load, but some slipping always exists because of the absence of definite poles in the annulus 55, so that there is never a one-to-one speed ratio between the shafts 10 and 11 in this form.

As another modification, instead of the rotor construction composed of laminations traversed by cross-connecting bars connecting short-circuiting rings, as formed by the lamination sections 47 and 48 and the bars 51 and rings 49 and 50 in Figs. 3 and 4 or the laminated annulus 55 with its associated parts in Fig. 7, such rotor may be a solid iron ring in which eddy currents produce the drag. Thus the nonmagnetic member 52 may carry a rotor which consists of a simple iron ring 60, preferably provided with a series of radially-extending slots 61 in the annularly intermediate portion thereof, as is clear from Figs. 5 and 6. In operation, eddy currents are produced in this iron ring, which eddy currents are directed and to some extent limited in their paths by the slots 61. The general action of this modification is substantially like that shown in Fig. 7.

In all these arrangements, there are relatively movable driving and driven members and a stationary member carrying a magnetizing coil, the magnetic portions of the stationary member and of one of the movable members being located between magnetic portions of the other movable member. In none of these modifications is it necessary to use slip rings or other moving contacts to supply current to the magnetizing coil.

I claim as my invention:

1. A magnetic clutch, comprising two rotatable magnetic members and a stationary magnetic member, and a stationary magnetizing coil, one of said rotatable magnetic members having two interconnected portions between which lie the other rotatable magnetic member and the stationary magnetic member so that together they form a substantially closed magnetic path for the magnetic flux produced by such magnetizing coil.

2. A magnetic clutch, comprising two rotatable magnetic members and a stationary magnetic member, and a stationary magnetizing coil, one of said rotatable magnetic members having two interconnected portions between which lie the other rotatable magnetic member and the stationary magnetic member so that together they form a substantially closed magnetic path for the magnetic flux produced by such magnetizing coil, the portion of said first rotatable member which lies next to one of the other members being formed of a plurality of definite poles so as to produce areas of magnetic concentration.

3. A magnetic clutch, comprising two rotatable magnetic members and a stationary magnetic member, and a stationary magnetizing coil, one of said rotatable magnetic members having two interconnected portions between which lie the other rotatable magnetic member and the stationary magnetic member so that together they form a substantially closed magnetic path for the magnetic flux produced by such magnetizing coil, the portion of said first rotatable member which lies next to one of the other members being formed of a plurality of definite poles so as to produce areas of magnetic concentration and the second rotatable magnetic member being provided with a number of short-circuited conducting members which cut the magnetic flux upon relative rotation between the two rotatable magnetic members.

4. A magnetic clutch, comprising two rotatable magnetic members and a stationary magnetic member, and a stationary magnetizing coil, one of said rotatable magnetic members having two interconnected portions between which lie the other rotatable magnetic member and the stationary magnetic member so that together they form a substantially closed magnetic path for the magnetic flux produced by such magnetizing coil, the second rotatable magnetic member being provided with a number of short-circuited conducting members which cut the magnetic flux upon relative rotation between the two rotatable magnetic members.

5. A magnetic clutch, comprising a stationary magnetic annulus, a stationary magnetizing coil in magnetizing relation thereto, and two separately rotatable magnetic members also in magnetizing relation to such coil, one of the rotatable magnetic members comprising two parts including definite polar projections, between which two parts both said stationary magnetic annulus and the other rotatable magnetic member lie.

6. A magnetic clutch, comprising a stationary magnetic annulus, a stationary magnetizing coil in magnetizing relation thereto, and two separately rotatable magnetic members also in magnetizing relation to such coil, one of the rotatable magnetic members comprising two parts including definite polar projections, between which two parts both said stationary magnetic annulus and the other rotatable magnetic member lie, said second rotatable magnetic member including short-circuited conducting members which cut the magnetic flux upon relative rotation between the two rotatable magnetic members.

In witness whereof, I have hereunto set my hand at Indianapolis, Indiana, this 7th day of February A. D. one thousand nine hundred and seventeen.

JARL M. WEYDELL.